US011205061B2

(12) United States Patent
Chung

(10) Patent No.: US 11,205,061 B2
(45) Date of Patent: Dec. 21, 2021

(54) LOW RESISTANCE FINGERPRINT SENSOR AND METHOD OF MANUFACTURING THE SAME

(71) Applicant: SAMSUNG ELECTRONICS CO., LTD., Suwon-si (KR)

(72) Inventor: Seokwhan Chung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/370,119

(22) Filed: Mar. 29, 2019

(65) Prior Publication Data

US 2020/0057878 A1 Feb. 20, 2020

(30) Foreign Application Priority Data

Aug. 16, 2018 (KR) ........................ 10-2018-0095732

(51) Int. Cl.
*G06K 9/00* (2006.01)
*G06F 3/044* (2006.01)

(52) U.S. Cl.
CPC .................................. *G06K 9/0002* (2013.01)

(58) Field of Classification Search
CPC ............ G06F 3/044; G06F 2203/0338; G06K 9/00006; G06K 9/001
See application file for complete search history.

(56) References Cited

U.S. PATENT DOCUMENTS

| 9,442,330 | B2 | 9/2016 | Huo | |
|---|---|---|---|---|
| 9,703,424 | B2 | 7/2017 | Kim et al. | |
| 2012/0199464 | A1* | 8/2012 | Kim | G06F 3/047 200/600 |
| 2013/0181944 | A1* | 7/2013 | Lee | G06F 3/044 345/174 |
| 2014/0168540 | A1* | 6/2014 | Wang | G06F 3/044 349/12 |
| 2014/0347319 | A1* | 11/2014 | Lin | G06F 3/044 345/174 |

(Continued)

FOREIGN PATENT DOCUMENTS

| KR | 10-1415583 B1 | 7/2014 |
|---|---|---|
| KR | 10-1572432 B1 | 11/2015 |
| KR | 10-2017-0124025 A | 11/2017 |

*Primary Examiner* — Lixi C Simpson
(74) *Attorney, Agent, or Firm* — Sughrue Mion, PLLC

(57) ABSTRACT

A fingerprint sensor includes a substrate, and a plurality of first electrodes disposed on the substrate, and including a plurality of first pattern parts and a plurality of first connectors. The plurality of first electrodes is repeatedly arranged in a second direction intersecting a first direction, and the plurality of first connectors connects the plurality of first pattern parts in the first direction. The fingerprint sensor further includes an insulating layer disposed on the plurality of first electrodes, and a plurality of second electrodes disposed on the insulating layer, and including a plurality of second pattern parts and a plurality of second connectors. The plurality of second electrodes is repeatedly arranged in the first direction, and the plurality of second connectors connects the plurality of second pattern parts in the second direction. The plurality of first connectors and/or the plurality of second connectors include a metal material.

11 Claims, 7 Drawing Sheets

(56) References Cited

U.S. PATENT DOCUMENTS

| | | | |
|---|---|---|---|
| 2015/0277483 A1* | 10/2015 | Lee | G06F 3/044 |
| | | | 345/174 |
| 2016/0209971 A1* | 7/2016 | Kim | G06F 3/044 |
| 2017/0091508 A1 | 3/2017 | Han et al. | |
| 2017/0147103 A1* | 5/2017 | Han | G06F 1/1652 |
| 2017/0316249 A1 | 11/2017 | Lee et al. | |
| 2018/0210589 A1* | 7/2018 | Pei | G06F 3/0412 |

* cited by examiner

LOW RESISTANCE FINGERPRINT SENSOR AND METHOD OF MANUFACTURING THE SAME

CROSS-REFERENCE TO RELATED APPLICATION

This application claims priority from Korean Patent Application No. 10-2018-0095732, filed on Aug. 16, 2018, in the Korean Intellectual Property Office, the disclosure of which is incorporated herein by reference in its entirety.

BACKGROUND

1. Field

Apparatuses and methods consistent with embodiments relate to a fingerprint sensor and a method of manufacturing the fingerprint sensor.

2. Description of the Related Art

There is an increasing need for personal authentication using a unique characteristic of a person, the characteristic including fingerprints, a voice, a face, hands, or irises. A personal authentication function is mainly used in financial equipment, access controllers, mobile devices, notebooks, or the like, and due to the wide spread of mobile devices such as smartphones, a fingerprint recognition device for personal authentication is used to protect lots of information stored in a smartphone.

A touchscreen device is mounted in a display of a smartphone and provides an intuitive input interface to a user, and in general, a fingerprint recognition device is arranged separately from the touchscreen device and is enabled to recognize a fingerprint only when a preset position is touched.

When a fingerprint recognition device is embodied on a display panel, an electrode of the fingerprint recognition device may be arranged as a transparent electrode to allow clear view of an image of the display panel. However, when the electrode includes such transparent electrode material, resistance of the electrode may be increased. Furthermore, to increase the resolution of the image of the display panel and sensitivity of the fingerprint recognition device, the size of the electrode has to be reduced, and accordingly, the resistance of the electrode including the transparent electrode material may be further increased.

SUMMARY

According to embodiments, a fingerprint sensor includes a substrate, and a plurality of first electrodes disposed on the substrate, and including a plurality of first pattern parts and a plurality of first connectors. The plurality of first electrodes is repeatedly arranged in a second direction intersecting a first direction, and the plurality of first connectors connects the plurality of first pattern parts in the first direction. The fingerprint sensor further includes an insulating layer disposed on the plurality of first electrodes, and a plurality of second electrodes disposed on the insulating layer, and including a plurality of second pattern parts and a plurality of second connectors. The plurality of second electrodes is repeatedly arranged in the first direction, and the plurality of second connectors connects the plurality of second pattern parts in the second direction. Either one or both of the plurality of first connectors and the plurality of second connectors include a metal material.

The metal material may include any one or any combination of platinum (Pt), ruthenium (Ru), gold (Au), silver (Ag), molybdenum (Mo), aluminum (Al), tungsten (W), palladium (Pd), magnesium (Mg), nickel (Ni), neodymium (Nd), iridium (Ir), chromium (Cr), titanium (Ti), or copper (Cu), and a metal alloy.

A remaining one of the plurality of first connectors and the plurality of second connectors may not include the metal material, and may include a first material same as a second material included in the plurality of first pattern parts and the plurality of second pattern parts.

The plurality of first connectors and the plurality of second connectors may include the metal material.

The plurality of first pattern parts and the plurality of second pattern parts may include a transparent conductive material.

The transparent conductive material may include either one or both of indium tin oxide (ITO) and a first material having an oxide-metal-oxide (OMO) structure.

Each of the plurality of first pattern parts and the plurality of second pattern parts may have a rhombus shape.

The first direction may be perpendicular to the second direction.

According to embodiments, a method of manufacturing a fingerprint sensor, includes forming, on a substrate, a plurality of first electrodes that includes a plurality of first pattern parts and a plurality of first connectors and is repeatedly arranged in a second direction intersecting a first direction. The plurality of first connectors connects the plurality of first pattern parts in the first direction. The method further includes forming an insulating layer on the plurality of first electrodes, and forming, on the insulating layer, a plurality of second electrodes that includes a plurality of second pattern parts and a plurality of second connectors and is repeatedly arranged in the first direction. The plurality of second connectors connects the plurality of second pattern parts in the second direction, and either one or both of the plurality of first connectors and the plurality of second connectors include a metal material The forming of the plurality of first electrodes may include forming the plurality of first pattern parts on the substrate, and forming the plurality of first connectors connecting the plurality of first pattern parts in the first direction, respectively in spaces among the plurality of first pattern parts.

The forming of the plurality of first electrodes may include forming the plurality of first connectors on the substrate, and forming the plurality of first pattern parts respectively in spaces among the plurality of first connectors, such that the plurality of first connectors connect the plurality of first pattern parts in the first direction.

The forming of the plurality of second electrodes may include forming the plurality of second pattern parts on the insulating layer, and forming the plurality of second connectors connecting the plurality of second pattern parts in the second direction, respectively in spaces among the plurality of second pattern parts.

The forming of the plurality of second electrodes may include forming the plurality of second connectors on the insulating layer, and forming the plurality of second pattern parts respectively in spaces among the plurality of second connectors, such that the plurality of second connectors connect the plurality of second pattern parts in the second direction.

A remaining one of the plurality of first connectors and the plurality of second connectors may not include the metal material, and may include a first material same as a second material included in the plurality of first pattern parts and the plurality of second pattern parts.

The plurality of first connectors and the plurality of second connectors may include the metal material.

DETAILED DESCRIPTION

Figure 1:
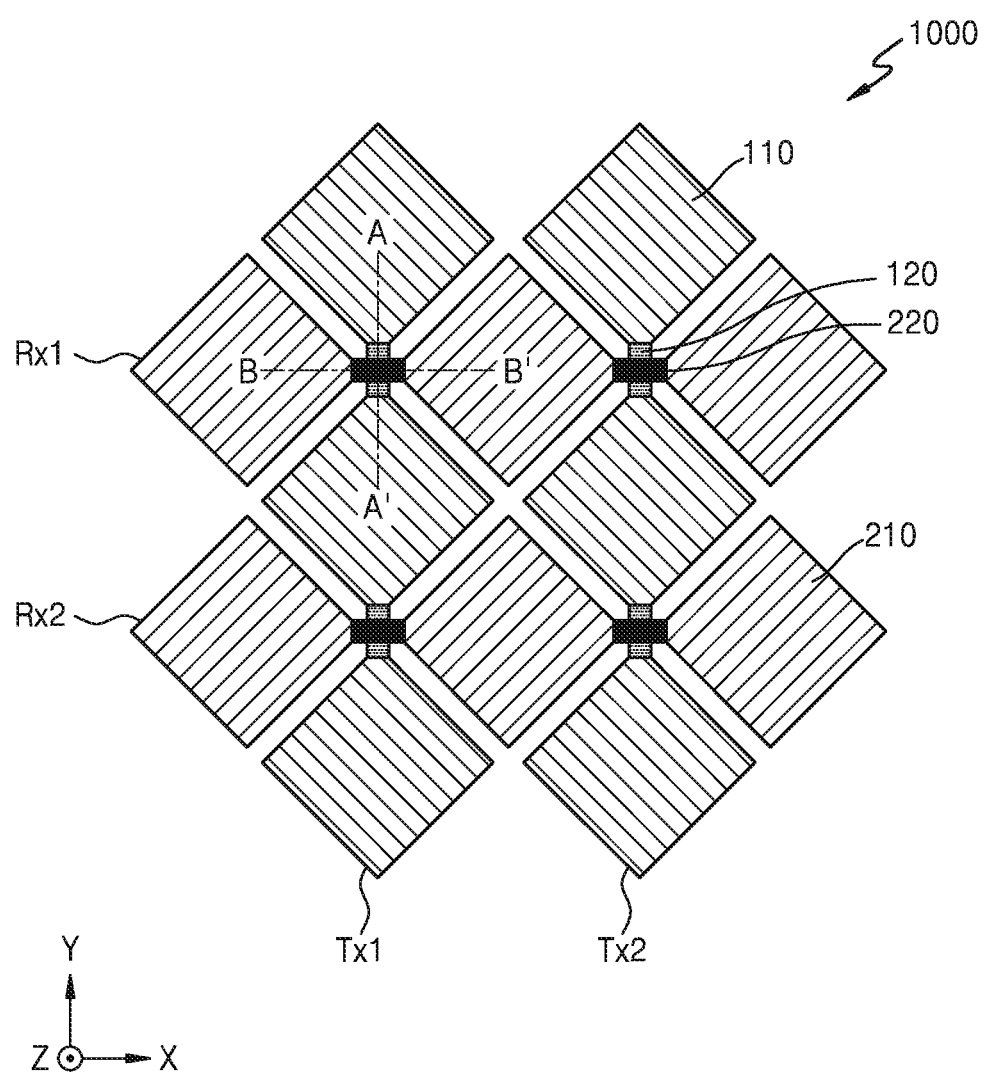
FIG. 1 is a plan view illustrating a fingerprint sensor according to embodiments.

Hereinafter, a low resistance fingerprint sensor and a method of manufacturing the low resistance fingerprint sensor will now be described with reference to the accompanying drawings. In the drawings, like reference numerals in the drawings denote like elements, and the size or thickness of each component may be exaggerated for clarity.

While terms "first" and "second" are used to describe various components, it is obvious that the components are not limited to the terms "first" and "second." The terms "first" and "second" are used only to distinguish between each of components. The low resistance fingerprint sensor and the method of manufacturing the low resistance fingerprint sensor may be embodied in many different forms and may not be construed as being limited to the embodiments set forth herein.

Throughout the specification, when a part "includes" or "comprises" an element, unless there is a particular description contrary thereto, the part can further include other elements, not excluding the other elements.

As used herein, the term "and/or" includes any and all combinations of one or more of the associated listed items. Expressions such as "at least one of," when preceding a list of elements, modify the entire list of elements and do not modify the individual elements of the list.

Figure 2:
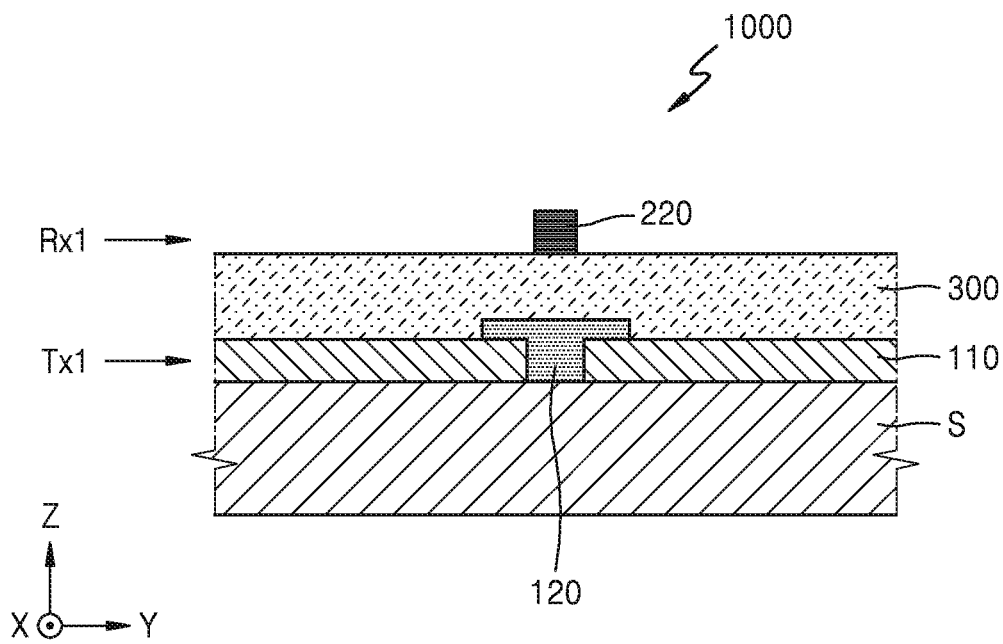
FIG. 2 is a cross-sectional view of the fingerprint sensor of FIG. 1, taken along a line A-A'.
Figure 3:
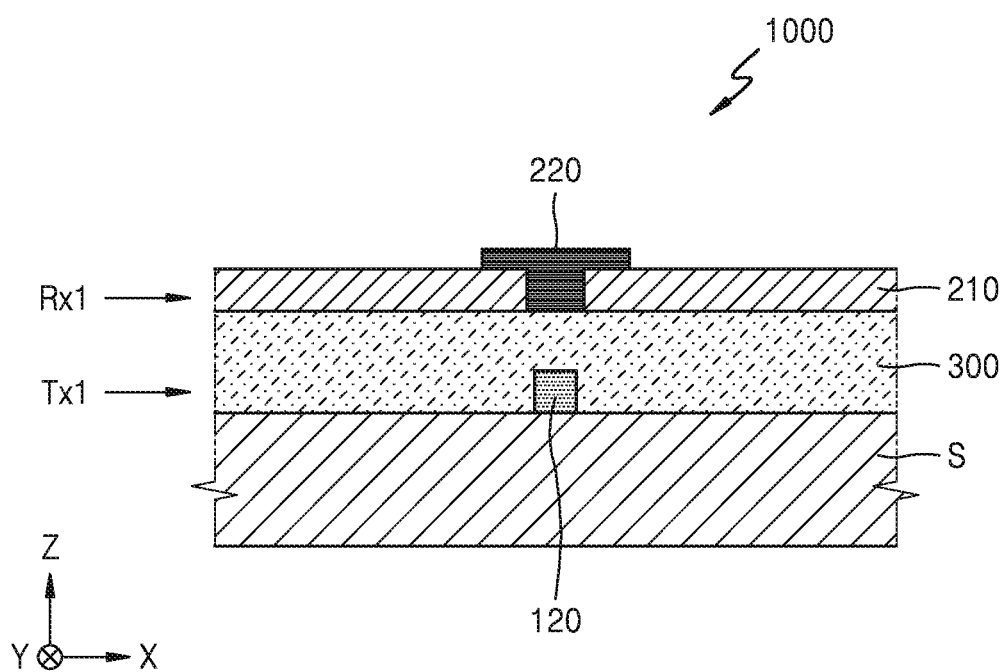
FIG. 3 is a cross-sectional view of the fingerprint sensor of FIG. 1, taken along a line B-B'.

FIG. 1 is a plan view illustrating a fingerprint sensor 1000 according to embodiments. FIG. 2 is a cross-sectional view of the fingerprint sensor 1000 of FIG. 1, taken along a line A-A'. FIG. 3 is a cross-sectional view of the fingerprint sensor 1000 of FIG. 1, taken along a line B-B'.

Referring to FIG. 1, the fingerprint sensor 1000 may include a plurality of first electrodes Tx1 and Tx2 and a plurality of second electrodes Rx1 and Rx2 arranged on the plurality of first electrodes Tx1 and Tx2, wherein the first electrodes Tx1 and Tx2 are arranged in parallel to a first direction (a y-axis direction) and are repeatedly arranged in a second direction (an x-axis direction) crossing the first direction (the y-axis direction) and the second electrodes Rx1 and Rx2 are arranged in parallel to the second direction (the x-axis direction) and are repeatedly arranged in the first direction (the y-axis direction). The first direction (the y-axis direction) and the second direction (the x-axis direction) may be perpendicular to each other.

A voltage may be externally applied to one of the first electrodes Tx1 and Tx2 and the second electrodes Rx1 and Rx2. When the voltage is applied to one of the first electrodes Tx1 and Tx2 and the second electrodes Rx1 and Rx2, mutual capacitance may be generated between the first electrodes Tx1 and Tx2 and the second electrodes Rx1 and Rx2. When a user touches one of the first electrodes Tx1 and Tx2 and the second electrodes Rx1 and Rx2 by using a finger, variation may occur in mutual capacitance generated between a touched region of the touched electrode and an untouched electrode. The variation in the mutual capacitance may vary in an electrode adjacent to ridges of a fingerprint of a surface of the finger of the user and in an electrode adjacent to valleys of the fingerprint. By allowing a distance between electrodes to be narrower than a distance between ridges or valleys of the fingerprint, variation in mutual capacitance due to the finger may be detected for each position, such that a fingerprint image may be calculated.

The first electrodes Tx1 and Tx2 may be driving electrodes to which a voltage is applied from an external source, and in this case, the second electrodes Rx1 and Rx2 may be sensing electrodes to which a measurer to sense variation in capacitance is connected. On the other hand, the second electrodes Rx1 and Rx2 may be driving electrodes to which a voltage is applied from an external source, and in this case, the first electrodes Tx1 and Tx2 may be sensing electrodes to which a measurer to sense variation in capacitance is connected. The sensing electrode may be an electrode to be touched by the finger of the user.

Referring to FIG. 2, a plurality of first pattern parts 110 may be arranged and spaced apart from each other on a substrate S. A plurality of first connectors 120 may be arranged in a plurality of spaces formed among the plurality of first pattern parts 110. In this case, the plurality of first connectors 120 may connect the plurality of first pattern parts 110 in the first direction (the y-axis direction). In this manner, the plurality of first pattern parts 110 are connected in the first direction (the y-axis direction) by the plurality of first connectors 120, such that the first electrodes Tx1 and Tx2 may be formed. The first electrodes Tx1 and Tx2 may be repeatedly arranged in the second direction (the x-axis direction). An insulating layer 300 may be formed on the first electrodes Tx1 and Tx2. The second electrodes Rx1 and Rx2 including a second pattern part 210 and a second connector 220 may be formed on the insulating layer 300. The insulating layer 300 may cover the first pattern part 110 and the first connector 120, thereby spacing the first electrodes Tx1 and Tx2 from the second electrodes Rx1 and Rx2. In the cross-section of the portion A-A', the second connector 220 of the second electrode Rx1 and Rx2 may be illustrated.

Referring to FIG. 3, a plurality of the second pattern parts 210 may be spaced apart from each other on the insulating layer 300. A plurality of the second connectors 220 may be arranged in a plurality of spaces formed among the plurality of second pattern parts 210. In this case, the plurality of second connectors 220 may connect the plurality of second pattern parts 210 in the second direction (the x-axis direction). In this manner, the plurality of second pattern parts 210 are connected in the second direction (the x-axis direction) by the plurality of second connectors 220 on the insulating layer 300, such that second electrodes Rx1 and Rx2 may be formed. The second electrodes Rx1 and Rx2 may be repeatedly arranged in the first direction (the y-axis direction).

The plurality of first electrodes Tx1 and Tx2 are arranged on the substrate S, and may include the plurality of first connectors 120 that connect the plurality of first pattern parts 110 in the first direction (the y-axis direction). FIG. 1 illustrates that each of first electrodes Tx1 and Tx2 includes three first pattern parts 110 and two first connectors 120, but the number of first pattern parts 110 and the number of first connectors 120 are not limited thereto and may be more than the illustration. The first electrodes Tx1 and Tx2 may be repeatedly arranged in parallel to the second direction (the x-axis direction). The insulating layer 300 may be arranged on the plurality of first electrodes Tx1 and Tx2.

The plurality of second electrodes Rx1 and Rx2 are arranged on the insulating layer 300, and may include the plurality of second pattern parts 210 and the plurality of second connectors 220 that connect the plurality of second pattern parts 210 in the second direction (the x-axis direction) crossing the first direction (the y-axis direction). FIG. 1 illustrates that each of second electrodes Rx1 and Rx2 includes three second pattern parts 210 and two second connectors 220, but the number of second pattern parts 210 and the number of second connectors 220 are not limited thereto and may be more than the illustration. The second electrode Rx1 and Rx2 may be repeatedly arranged in parallel to the first direction (the y-axis direction).

Each of the plurality of first pattern parts 110 and each of the plurality of second pattern parts 210 may include a transparent conductive material. The transparent conductive material may include either one or both of indium tin oxide (ITO) and a material having an oxide-metal-oxide (OMO) structure. A sheet resistance of the transparent conductive material may be between about 1Ω and about 20Ω. Also, light transmittance of the transparent conductive material may be between about 70% and about 95%.

Each of the plurality of first pattern parts 110 and each of the plurality of second pattern parts 210 may have a rhombus shape. However, a pattern shape of the plurality of first pattern parts 110 and the plurality of second pattern parts 210 is not limited to the rhombus shape and may have one of various shapes including a polygonal shape, a round shape, or the like.

The fingerprint sensor 1000 of FIG. 1 includes two first electrodes Tx1 and Tx2 and two second electrodes Rx1 and Rx2, but the disclosure is not limited thereto and the fingerprint sensor 1000 may include at least three first electrodes Tx1 and Tx2 and at least three second electrodes Rx1 and Rx2.

Either one or both of the first connector 120 and the second connector 220 may include a metal material. The metal material may include a conductive metal material including platinum (Pt), ruthenium (Ru), gold (Au), silver (Ag), molybdenum (Mo), aluminum (Al), tungsten (W), palladium (Pd), magnesium (Mg), nickel (Ni), neodymium (Nd), iridium (Ir), chromium (Cr), titanium (Ti), or copper (Cu) or a metal alloy. A thickness and length of each of the first connector 120 and the second connector 220 may be appropriately set so that a value of sheet resistance of each of the first connector 120 and the second connector 220 is between about 0.01Ω and about 1Ω.

Because the plurality of first pattern parts 110 and the plurality of second pattern parts 210 are connected by the plurality of first connectors 120 and the plurality of second connectors 220, each of the plurality of first connectors 120 and each of the plurality of second connectors 220 including the metal material, sheet resistance of each of the first electrode Tx1 and Tx2 and the second electrode Rx1 and Rx2 may be decreased compared to a case in which each of the plurality of first connectors 120 and each of the plurality of second connectors 220 do not include the metal material.

Figure 4:
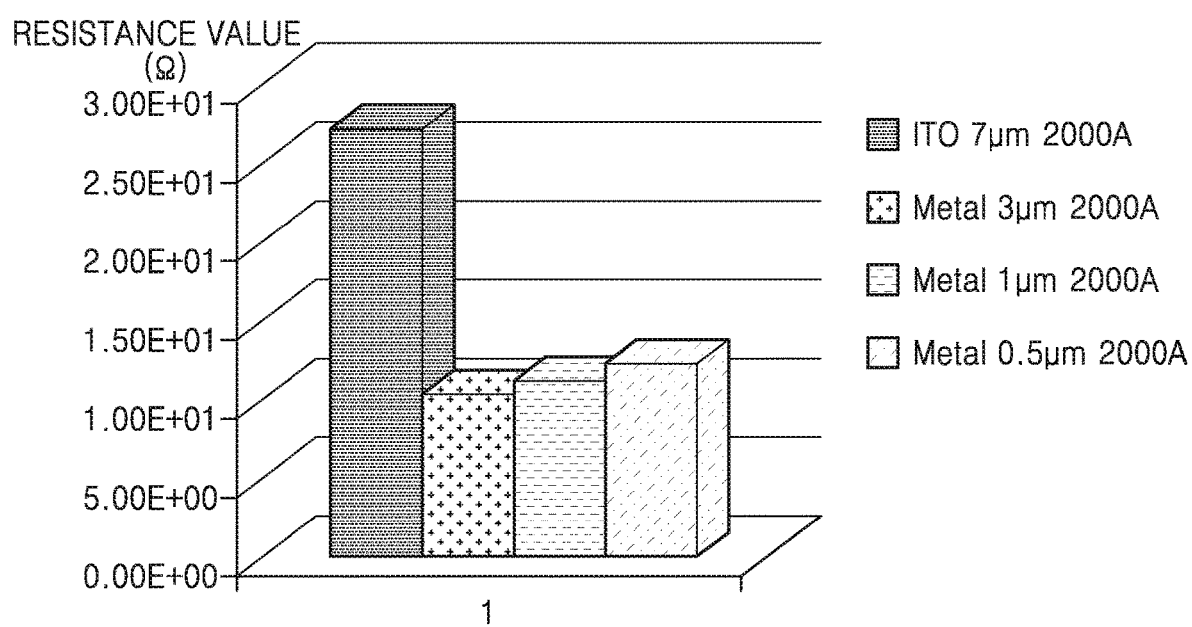
FIG. 4 is a graph of a comparison between resistance values of an electrode of the fingerprint sensor according to types and shapes of a connector included in the fingerprint sensor of FIG. 1.

FIG. 4 is a graph of a comparison between resistance values of an electrode of the fingerprint sensor 1000 according to types and shapes of a connector included in the fingerprint sensor 1000 of FIG. 1.

Referring to FIG. 4, a resistance value of the electrode of the fingerprint sensor 1000 when the first connector 120 or the second connector 220 includes a transparent conductive material, e.g., ITO, may be different from a resistance value of the electrode of the fingerprint sensor 1000 when the first connector 120 or the second connector 220 includes a metal material.

First, in a case in which the first connector 120 or the second connector 220 includes ITO that is the transparent conductive material, a line width of the first connector 120 or the second connector 220 is 7 μm, and a thickness of the first connector 120 or the second connector 220 in a z-axis direction of FIGS. 1 to 3 is 0.2 μm, a resistance value of the electrode may be about 27Ω.

When the first connector 120 or the second connector 220 includes the metal material, three cases of a resistance value of the electrode are illustrated. First, in the case in which the line width of the first connector 120 or the second connector 220 is 3 μm, and the thickness of the first connector 120 or the second connector 220 in the z-axis direction is 0.2 μm, a resistance value of the electrode may be about 10.4Ω. Next, in the case in which the line width of the first connector 120 or the second connector 220 is 1 μm, and the thickness of the first connector 120 or the second connector 220 in the z-axis direction is 0.2 μm, a resistance value of the electrode may be about 11.2Ω. Lastly, in the case in which the line width of the first connector 120 or the second connector 220 is 3 μm, and the thickness of the first connector 120 or the second connector 220 in the z-axis direction is 0.2 μm, a resistance value of the electrode may be about 12.4Ω.

In this manner, a resistance value of the electrode of the case in which the first connector 120 or the second connector 220 includes the metal material may be decreased to about ⅓ to about ½ of a resistance value of the electrode of the case in which the first connector 120 or the second connector 220 includes the transparent conductive material.

Figure 5:
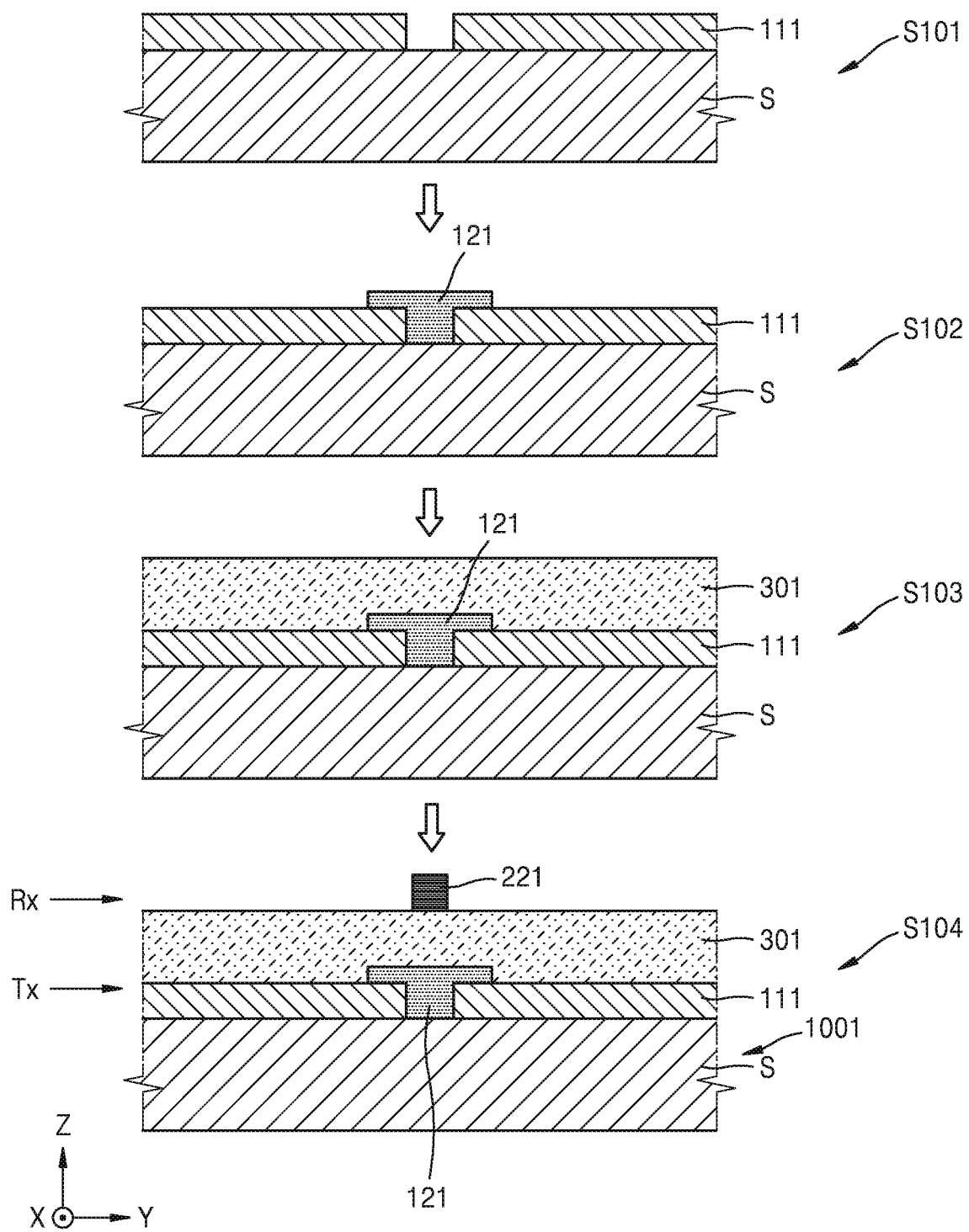
FIG. 5 illustrates sequential operations of a method of manufacturing a fingerprint sensor according to embodiments.
Figure 6:
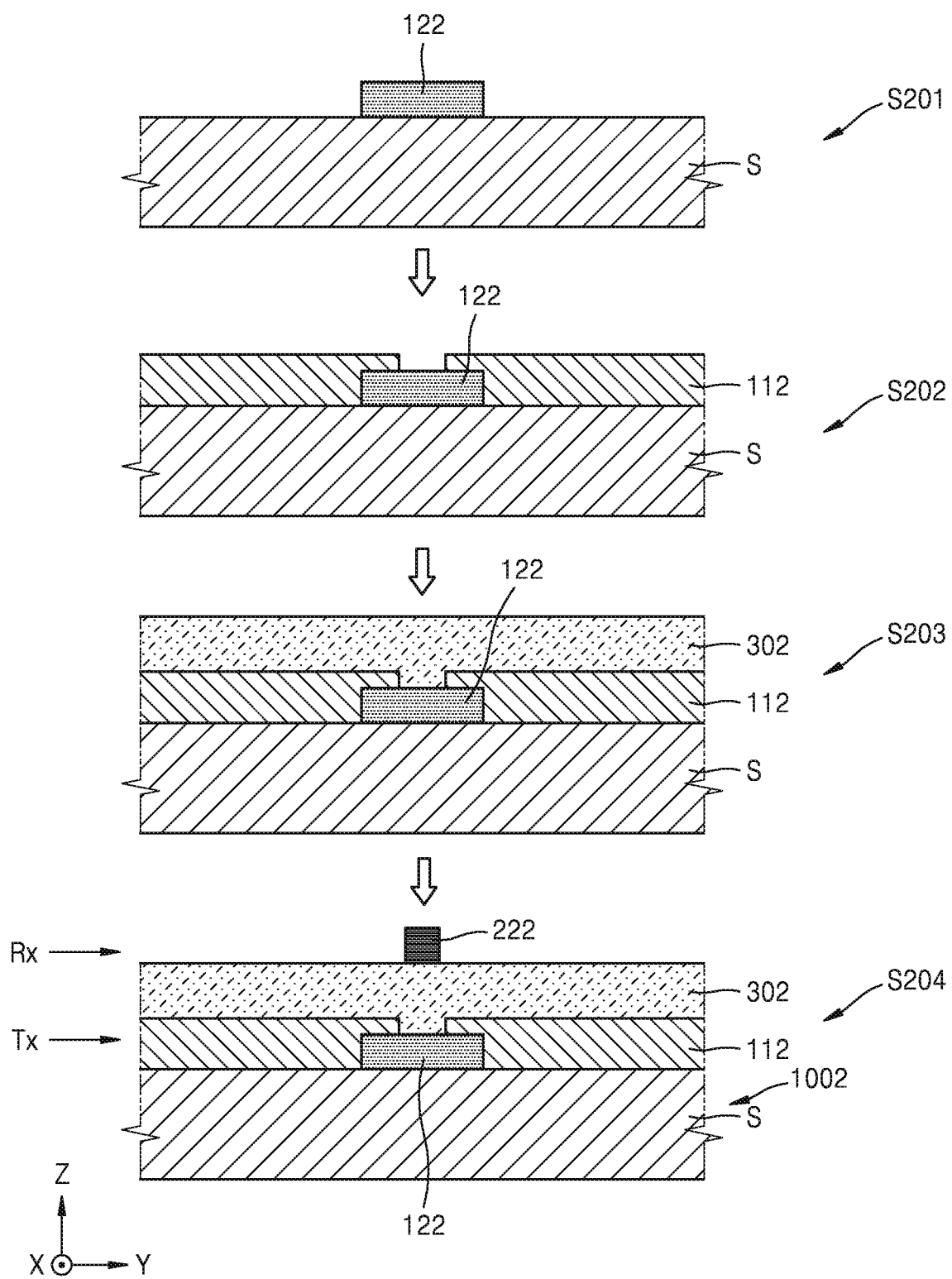
FIG. 6 illustrates sequential operations of a method of manufacturing a fingerprint sensor according to other embodiments.

FIG. 5 illustrates sequential operations of a method of manufacturing a fingerprint sensor 1001 according to embodiments. FIG. 6 illustrates sequential operations of a method of manufacturing a fingerprint sensor 1002 according to other embodiments.

Referring to FIG. 5, in first operation S101, a plurality of first pattern parts 111 may be formed separately from each other on a substrate S. The plurality of first pattern parts 111 may each be formed via etching. Alternatively, well-known techniques may be used to form the plurality of first pattern parts 111.

In second operation S102, a plurality of first connectors 121 may be arranged in a plurality of spaces formed among the plurality of first pattern parts 111. In this case, the plurality of first connectors 121 may connect the plurality of first pattern parts 111 in a first direction (a y-axis direction).

In this manner, a first electrode Tx including the plurality of first connectors 121 and the plurality of first pattern parts 111 may be formed.

In third operation S103, an insulating layer 301 may be formed on the first electrode Tx. The insulating layer 301 may include various insulating materials that are not conductive. The insulating layer 301 may insulate the first electrode Tx from a second electrode Rx to be arranged on the insulating layer 301 as will be described below.

In fourth operation S104, the second electrode Rx including a second pattern part and a second connector 221 may be formed on the insulating layer 301. A process of forming the second electrode Rx may be equal to a process of forming the first electrode Tx described with reference to FIG. 5. FIG. 5 illustrates only the second connector 221 of the second electrode Rx and does not illustrate the second pattern part, because the first electrode Tx and the second electrode Rx are arranged in an intersecting direction.

Referring to FIG. 6, in first operation S201, a plurality of first connectors 122 may be formed on a substrate S. The plurality of first connectors 122 may connect a plurality of first pattern parts 112 to be formed in a first direction (a y-axis direction).

In second operation S202, the first pattern part 112 may be formed at both sides of the first connector 122 in the first direction (the y-axis direction). By doing so, the plurality of first pattern parts 112 may be connected by the plurality of first connectors 122 in the first direction (the y-axis direction). In this manner, a first electrode Tx including the plurality of first connectors 122 and the plurality of first pattern parts 112 may be formed.

In third operation S203, an insulating layer 302 may be formed on the first electrode Tx including the plurality of first pattern parts 112 and the plurality of first connectors 122. The insulating layer 302 may include various insulating materials that are not conductive. The insulating layer 302 may insulate the first electrode Tx from a second electrode Rx to be arranged on the insulating layer 302 as will be described below.

In fourth operation S204, the second electrode Rx including a second pattern part and a second connector 222 may be formed on the insulating layer 302. A process of forming the second electrode Rx may be equal to a process of forming the first electrode Tx described with reference to FIG. 6. FIG. 6 illustrates only the second connector 222 of the second electrode Rx and does not illustrate the second pattern part, because the first electrode Tx and the second electrode Rx are arranged in an intersecting direction.

As described above with reference to FIG. 5, when the first electrode Tx is formed, the first pattern part 111 may be first formed and then the first connector 121 may be formed. Alternatively, as described above with reference to FIG. 6, when the first electrode Tx is formed, the first connector 122 may be first formed and then the first pattern part 112 may be formed. The manufacturing order of the first electrode Tx may be selected according to etching selectivity by a manufacturer, the etching selectivity being with respect to a transparent conductive material that may be included in the first pattern part 111 or 112 and a metal material that may be included in the first connector 121 or 122. The manufacturing order of the second electrode Rx may also be selected according to etching selectivity by a manufacturer.

Figure 7:
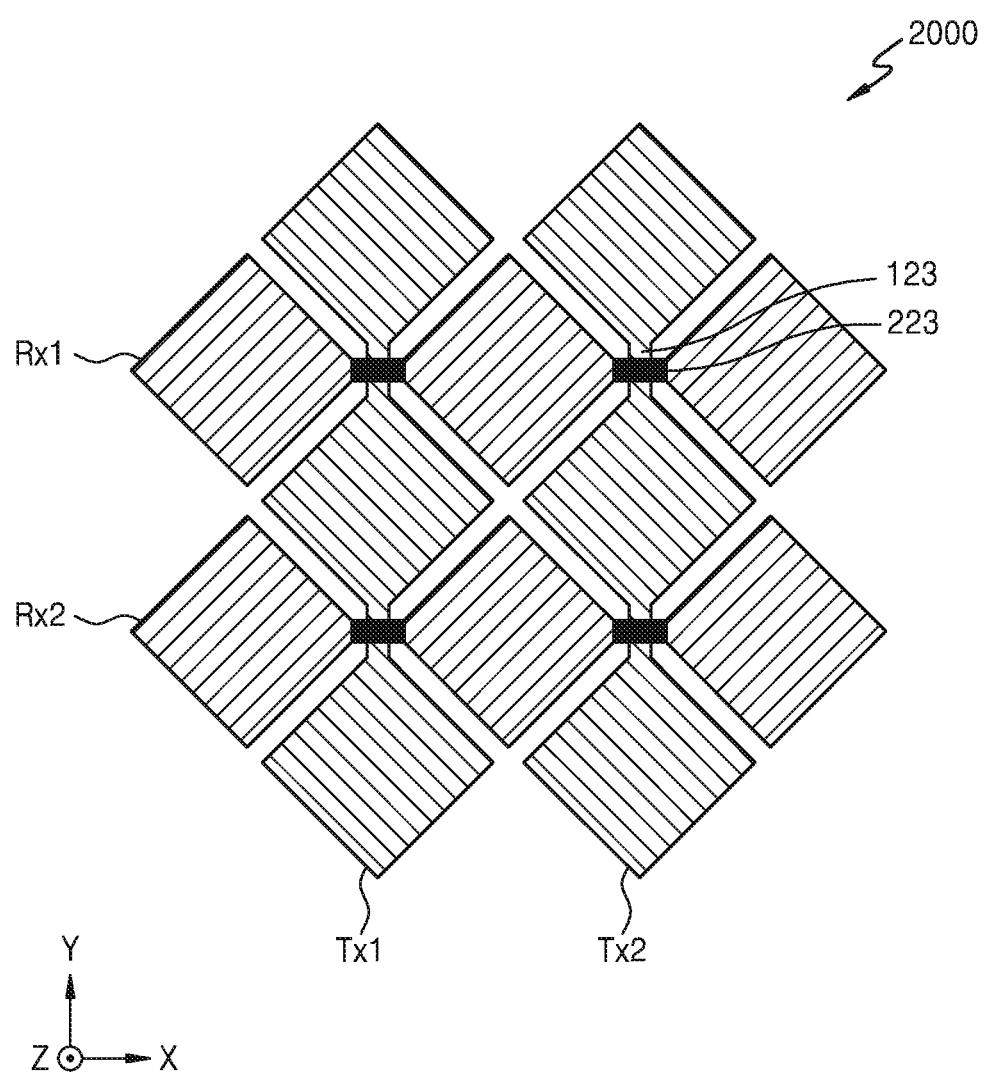
FIG. 7 is a plan view illustrating a fingerprint sensor according to other embodiments.

FIG. 7 is a plan view illustrating a fingerprint sensor 2000 according to other embodiments. Descriptions of FIG. 7 that are redundant with descriptions of FIG. 1 are not provided.

Referring to FIG. 7, a plurality of first connectors 123 included in a plurality of first electrodes Tx1 and Tx2 may include a transparent conductive material, the plurality of first electrodes Tx1 and Tx2 being in parallel to a first direction (a y-axis direction) and repeatedly arranged in a second direction (an x-axis direction).

A plurality of second connectors 223 included in a plurality of second electrodes Rx1 and Rx2 may include a metal material, the plurality of second electrodes Rx1 and Rx2 being in parallel to the second direction (the x-axis direction) and repeatedly arranged in the first direction (the y-axis direction).

By doing so, the fingerprint sensor 2000 in which only the second connector 223 among the first connector 123 and the second connector 223 includes the metal material may be manufactured.

Figure 8:
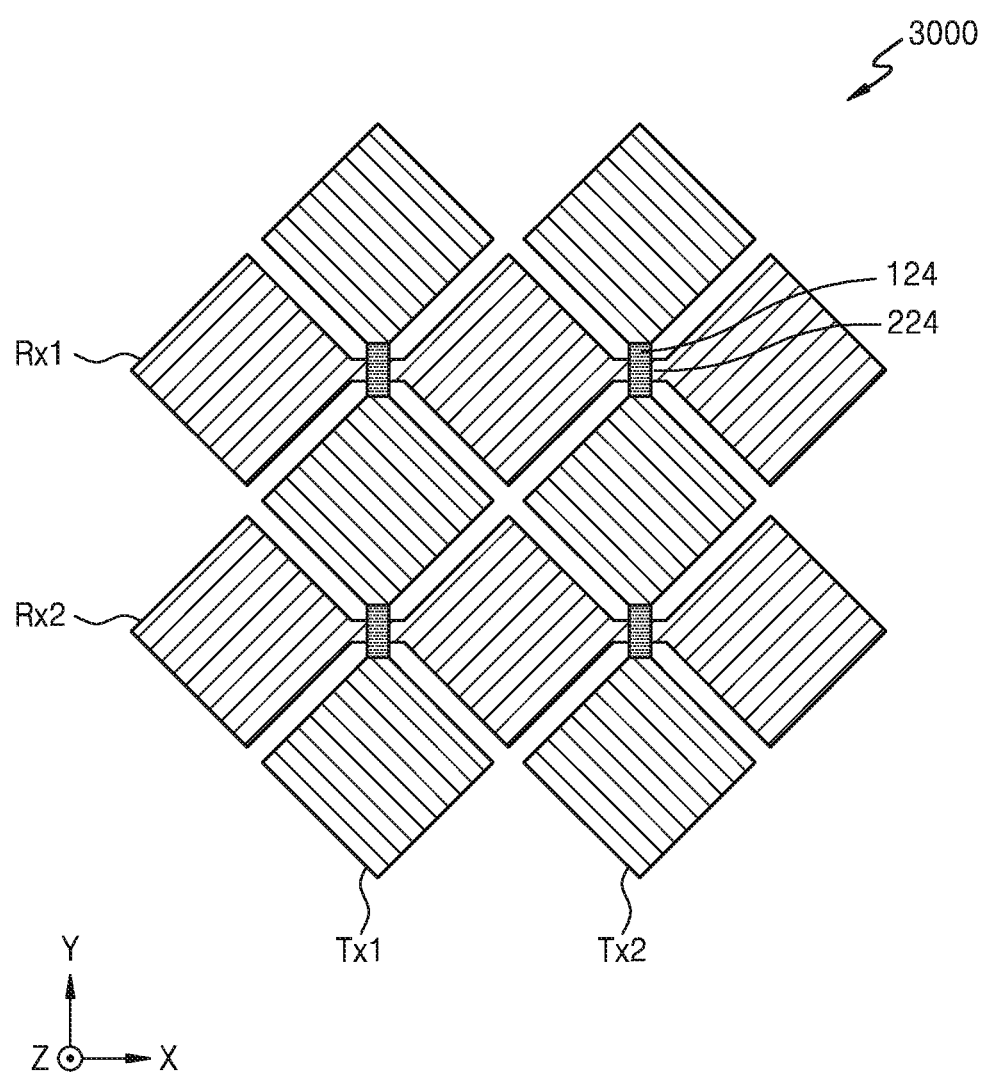
FIG. 8 is a plan view illustrating a fingerprint sensor according to other embodiments.

FIG. 8 is a plan view illustrating a fingerprint sensor 3000 according to other embodiments. Descriptions of FIG. 8 that are redundant with descriptions of FIG. 1 are not provided.

Referring to FIG. 8, a plurality of first connectors 124 included in a plurality of first electrodes Tx1 and Tx2 may each include a metal material, the plurality of first electrodes Tx1 and Tx2 being in parallel to a first direction (a y-axis direction) and repeatedly arranged in a second direction (an x-axis direction).

A plurality of second connectors 224 included in a plurality of second electrodes Rx1 and Rx2 may each include a transparent metal material, the plurality of second electrodes Rx1 and Rx2 being in parallel to the second direction (the x-axis direction) and repeatedly arranged in the first direction (the y-axis direction).

By doing so, the fingerprint sensor 3000 in which only the first connector 124 among the first connector 124 and the second connector 224 includes the metal material may be manufactured.

Various embodiments of the disclosure may provide a fingerprint sensor whose resistance value is decreased by including a plurality of connectors including a metal.

While one or more embodiments have been described with reference to the figures, it will be understood by those of ordinary skill in the art that various changes in form and details may be made therein without departing from the spirit and scope as defined by the following claims.

What is claimed is:

1. A fingerprint sensor comprising:
    a substrate;
    a plurality of first electrodes disposed on the substrate, and comprising a plurality of first pattern parts and a plurality of first connectors, wherein the plurality of first electrodes is repeatedly arranged in a second direction intersecting a first direction, and the plurality of first connectors connects the plurality of first pattern parts in the first direction;
    an insulating layer disposed on the plurality of first electrodes, and covering the plurality of first pattern parts and the plurality of first connectors; and
    a plurality of second electrodes disposed on the insulating layer, and comprising a plurality of second pattern parts and a plurality of second connectors, wherein the plurality of second electrodes is repeatedly arranged in the first direction, and the plurality of second connectors connects the plurality of second pattern parts in the second direction,
    wherein either one or both of the plurality of first connectors and the plurality of second connectors comprise a metal material,
    wherein each of the plurality of first connectors connecting the plurality of first pattern parts in the first direction is formed to, when viewed in a cross section, fill an entire space between a side wall of a first one of the plurality of first pattern parts and a side wall of a second one of the plurality of first pattern parts disposed next to the first one of the plurality of the first pattern parts in the first direction, and to cover at least portions of upper surfaces of the first one and the second one of the plurality of first pattern parts, wherein the plurality of first pattern parts and the plurality of first connectors are disposed on a lower surface of the insulating layer and the plurality of second pattern parts and the plurality of second connectors are disposed on an upper surface of the insulating layer, and wherein each of the plurality of second connectors connecting the plurality of second pattern parts in the second direction is formed to, when viewed in a cross section, fill an entire space between a side wall of a first one of the plurality of second pattern parts and a side wall of a second one of the plurality of second pattern parts disposed next to the first one of the plurality of the second pattern parts in the second direction, and to cover at least portions of upper surfaces of the first one and the second one of the plurality of second pattern parts.

2. The fingerprint sensor of claim 1, wherein the metal material comprises any one or any combination of platinum (Pt), ruthenium (Ru), gold (Au), silver (Ag), molybdenum (Mo), aluminum (Al), tungsten (W), palladium (Pd), magnesium (Mg), nickel (Ni), neodymium (Nd), iridium (Ir), chromium (Cr), titanium (Ti), or copper (Cu), and a metal alloy.

3. The fingerprint sensor of claim 1, wherein a remaining one of the plurality of first connectors and the plurality of second connectors does not comprise the metal material, and comprises a first material same as a second material comprised in the plurality of first pattern parts and the plurality of second pattern parts.

4. The fingerprint sensor of claim 1, wherein the plurality of first connectors and the plurality of second connectors comprise the metal material.

5. The fingerprint sensor of claim 1, wherein the plurality of first pattern parts and the plurality of second pattern parts comprise a transparent conductive material.

6. The fingerprint sensor of claim 5, wherein the transparent conductive material comprises either one or both of indium tin oxide (ITO) and a first material having an oxide-metal-oxide (OMO) structure.

7. The fingerprint sensor of claim 1, wherein each of the plurality of first pattern parts and the plurality of second pattern parts has a rhombus shape.

8. The fingerprint sensor of claim 1, wherein the first direction is perpendicular to the second direction.

9. A method of manufacturing a fingerprint sensor, the method comprising:
forming, on a substrate, a plurality of first electrodes that comprises a plurality of first pattern parts and a plurality of first connectors and is repeatedly arranged in a second direction intersecting a first direction, wherein the plurality of first connectors connects the plurality of first pattern parts in the first direction;

forming an insulating layer on the plurality of first electrodes, the insulating layer covering the plurality of first pattern parts and the plurality of first connectors; and forming, on the insulating layer, a plurality of second electrodes that comprises a plurality of second pattern parts and a plurality of second connectors and is repeatedly arranged in the first direction, wherein the plurality of second connectors connects the plurality of second pattern parts in the second direction, and wherein either one or both of the plurality of first connectors and the plurality of second connectors comprise a metal material, wherein the forming of the plurality of first electrodes comprises:

forming the plurality of first pattern parts on the substrate; and forming each of the plurality of first connectors connecting the plurality of first pattern parts in the first direction to, when viewed in a cross section, fill an entire space between a side wall of a first one of the plurality of first pattern parts and a side wall of a second one of the plurality of first pattern parts disposed next to the first one of the plurality of the first pattern parts in the first direction, and to cover at least portions of upper surfaces of the first one and the second one of the plurality of first pattern parts, wherein the plurality of first pattern parts and the plurality of first connectors are disposed on a lower surface of the insulating layer and the plurality of second pattern parts and the plurality of second connectors are disposed on an upper surface of the insulating layer, and wherein each of the plurality of second connectors connecting the plurality of second pattern parts in the second direction is formed to, when viewed in a cross section, fill an entire space between a side wall of a first one of the plurality of second pattern parts and a side wall of a second one of the plurality of second pattern parts disposed next to the first one of the plurality of the second pattern parts in the second direction, and to cover at least portions of upper surfaces of the first one and the second one of the plurality of second pattern parts.

10. The method of claim 9, wherein a remaining one of the plurality of first connectors and the plurality of second connectors does not comprise the metal material, and comprises a first material same as a second material comprised in the plurality of first pattern parts and the plurality of second pattern parts.

11. The method of claim 9, wherein the plurality of first connectors and the plurality of second connectors comprise the metal material.

* * * * *